(12) United States Patent
Wei et al.

(10) Patent No.: US 8,301,802 B2
(45) Date of Patent: Oct. 30, 2012

(54) SYSTEMS AND METHODS FOR DETECTING AND PREVENTING FLOODING ATTACKS IN A NETWORK ENVIRONMENT

(75) Inventors: Shaohong Wei, Sunnyvale, CA (US); Gang Duan, Fremont, CA (US); Zhongqiang Chen, Sunnyvale, CA (US); Bing Xie, Palo Alto, CA (US)

(73) Assignee: Fortinet, Inc., Sunnyvale, CA (US)

( * ) Notice: Subject to any disclaimer, the term of this patent is extended or adjusted under 35 U.S.C. 154(b) by 262 days.

(21) Appl. No.: 12/566,371

(22) Filed: Sep. 24, 2009

(65) Prior Publication Data

US 2010/0011124 A1   Jan. 14, 2010

Related U.S. Application Data

(63) Continuation of application No. 11/176,494, filed on Jul. 6, 2005, now Pat. No. 7,609,625.

(51) Int. Cl.
*G06F 15/173* (2006.01)

(52) U.S. Cl. ........ 709/243; 709/224; 370/252; 370/392; 370/401; 713/170; 713/176

(58) Field of Classification Search .................. 370/252, 370/392, 395.43, 401; 709/330, 224; 713/201
See application file for complete search history.

(56) References Cited

U.S. PATENT DOCUMENTS

| | | | |
|---|---|---|---|
| 7,529,187 B1 | 5/2009 | Hernacki et al. | |
| 2002/0095529 A1* | 7/2002 | Syvanne | ........................ 709/330 |
| 2003/0123452 A1* | 7/2003 | Cox et al. | ................. 370/395.43 |
| 2004/0215976 A1 | 10/2004 | Jain | |
| 2004/0255162 A1* | 12/2004 | Kim et al. | ..................... 713/201 |
| 2005/0259644 A1 | 11/2005 | Huitema et al. | |
| 2006/0133377 A1* | 6/2006 | Jain | .............................. 370/392 |
| 2007/0019543 A1 | 1/2007 | Wei et al. | |
| 2007/0110053 A1 | 5/2007 | Soni et al. | |

OTHER PUBLICATIONS

"U.S. Appl. No. 11/176,494, Final office Action mailed Sep. 18, 2008", 5 pgs.
"U.S. Appl. No. 11/176,494, Non-Final Office Action mailed Dec. 17, 2008", 18 pgs.
"U.S. Appl. No. 11/176,494, Response filed Nov. 13, 2008 to Final Office Action mailed Sep. 18, 2008", 9 pgs.
"U.S. Appl. No. 11/176,494, Notice of Allowance mailed Jun. 24, 2009", 5 Pgs.
"U.S. Appl. No. 11/176,494, Response filed May 18, 2009 to Non Final Office Action mailed Dec. 17, 2008", 8 pgs.

* cited by examiner

*Primary Examiner* — Robert Wilson
*Assistant Examiner* — Mohamed Kamara
(74) *Attorney, Agent, or Firm* — Schwegman Lundberg & Woessner, P.A.

(57) ABSTRACT

A method for processing network traffic data includes receiving a packet, and determining whether the packet is a previously dropped packet that is being retransmitted. A method for processing network traffic content includes receiving a plurality of headers, the plurality of headers having respective first field values, and determining whether the first field values of the respective headers form a first prescribed pattern. A method for processing network traffic content includes receiving a plurality of packets, and determining an existence of a flooding attack without tracking each of the plurality of packets with a SYN bit.

18 Claims, 7 Drawing Sheets

SYSTEMS AND METHODS FOR DETECTING AND PREVENTING FLOODING ATTACKS IN A NETWORK ENVIRONMENT

RELATED APPLICATIONS

This application is a Continuation of U.S. application Ser. No. 11/176,494, filed on Jul. 6, 2005, which is incorporated herein by reference in its entirety.

BACKGROUND

The field of the invention relates to computer systems and computer networks, and more particularly, to systems and methods for detecting and preventing flooding attacks in a network environment.

Flooding attack is a type of computer/network intrusion in which the attacker causes a high volume of sessions/connections to be created against a receiver, thereby "flooding" the computer/network of the receiver. Examples of flooding attacks include TCP flooding attacks (such as SYN flooding attacks), UDP flooding attacks, and ICMP flooding attacks. A SYN flooding attack is a connection based attack that uses TCP packets to attack a network (or a part of a network, such as a firewall), thereby overflowing session tables and/or exhausting available bandwidth. UDP flooding attack and ICMP flooding attack are non-connection based attacks, which are carried out by overflowing virtual session tables and/or exhausting available bandwidth.

For TCP connection, the traditional SYN proxy prevention technique involves tracking each received SYN packet, regardless of whether it belongs to flooding traffic or legitimate traffic, thereby requiring a tremendous amount of system resources, such as memory, CPU cycles, storage space, and processing time. Some conventional flooding prevention devices are configured to transmit a SYN-ACK packet in response to a received SYN packet, acknowledging to a sender of the SYN packet that the SYN packet has been received. Such is performed for every SYN packet, regardless of whether the sender is a legitimate user or an attacker. These flooding prevention devices require a lot of memory and system resources in order to keep track with the received SYN packets and the SYN-ACK packets. If a flooding attack is relatively heavy, the system resources of the prevention device could be exhausted by the flooding attack. In some cases, the additional SYN-ACK packet from the prevention device may double the flooding traffic, thereby causing legitimate traffic to be dropped even at link layer.

SUMMARY

In accordance to some embodiments, a method for processing network, traffic data includes receiving a packet, and determining whether the packet is a previously dropped packet that is being retransmitted.

In accordance to other embodiments, a system for processing network traffic data includes means for receiving a packet, and means for determining whether the packet is a previously dropped packet that is being retransmitted.

In accordance to other embodiments, a computer product includes a computer-readable medium, the computer-readable medium having a set of stored instructions, an execution of which causes a process to be performed, the process comprising receiving a packet, and determining whether the packet is a previously dropped packet that is being retransmitted.

In accordance to other embodiments, a method for processing network traffic content includes receiving a plurality of headers, the plurality of headers having respective first field values, and determining whether the first field values of the respective headers form a first prescribed pattern.

In accordance to other embodiments, a system for processing network traffic content includes means for receiving a plurality of headers, the plurality of headers having respective first field values, and means for determining whether the first field values of the respective headers form a first prescribed pattern.

In accordance to other embodiments, a computer product includes a computer-readable medium, the computer-readable medium having a set of stored instructions, an execution of which causes a process to be performed, the process comprising receiving a plurality of headers, the plurality of headers having respective first field values, and determining whether the first field values of the respective headers form a first prescribed pattern.

In accordance to other embodiments, a method for processing network traffic content includes receiving a plurality of packets, and determining an existence of a flooding attack without tracking each of the plurality of packets.

In accordance to other embodiments, a system for processing network traffic content includes means for receiving a plurality of packets, and means for determining an existence of a flooding attack without tracking each of the plurality of packets.

In accordance to other embodiments, a computer product includes a computer-readable medium, the computer-readable medium having a set of stored instructions, an execution of which causes a process to be performed, the process comprising receiving a plurality of packets, and determining an existence of a flooding attack without tracking each of the plurality of packets.

Other aspects and features will be evident from reading the following detailed description of the preferred embodiments, which are intended to illustrate, not limit, the invention.

BRIEF DESCRIPTION OF THE DRAWINGS

The drawings illustrate the design and utility of various embodiments, in which similar elements are referred to by common reference numerals. More particular descriptions will be rendered by reference to specific embodiments, which are illustrated in the accompanying drawings. Understanding that these drawings are not to be considered limiting in scope, the embodiments will be described and explained with additional specificity and detail through the use of the accompanying figures.

DETAILED DESCRIPTION

Figure 1:
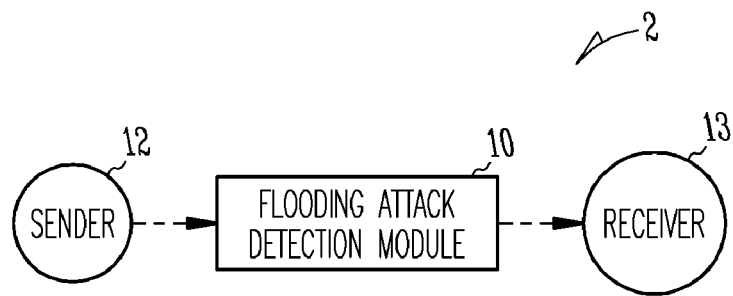
FIG. 1 illustrates a block diagram representing a system that includes a module for processing network traffic data in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of specific embodiments, and are not intended as an exhaustive description of the invention, or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated.

FIG. 1 illustrates a block diagram of a system 2, which includes a module 10 for processing network traffic data in accordance with some embodiments. Module 10 is communicatively coupled between sender 12 and receiver 13. However, in other embodiments, module 10 can be a part of, or be integrated with, sender 12, receiver 13, or both. During use, sender 12 transmits data (packet) to module 10. Module 10 receives the transmitted data, and determines whether the packet is associated with a flooding attack. In some embodiments, the packet received by module 10 is a SYN packet, which is used to create a session/connection. In other embodiments, the packet received by module 10 can by other types of packet. As used in this specification, the term "sender" should not be limited to a human, and can include a server or other types of devices (software and/or hardware) that can receive and/or transmit information. Also, as used in this specification, the term "receiver" should not be limited to a human receiver, and can include a server or other types of devices (software and/or hardware) that can store, receive, and/or transmit information.

In some embodiments, module 10 can be implemented using software. For example, module 10 can be implemented using software that is loaded onto a user's computer, a server, or other types of memory, such as a disk or a CD-ROM. In some cases, module 10 can be implemented as web applications. In alternative embodiments, module 10 can be implemented using hardware. For example, in some embodiments, module 10 includes an application-specific integrated circuit (ASIC), such as a semi-custom ASIC processor or a programmable ASIC processor. ASICs, such as those described in Application-Specific Integrated Circuits by Michael J. S. Smith, Addison-Wesley Pub Co. (1st Edition, June 1997), are well known in the art of circuit design, and therefore will not be described in further detail herein. In other embodiments, module 10 can also be any of a variety of circuits or devices that are capable of performing the functions described herein. For example, in alternative embodiments, module 10 can include a general purpose processor, such as a Pentium processor. In other embodiments, module 10 can be implemented using a combination of software and hardware. In some embodiments, module 10 may be implemented as a firewall, a component of a firewall, or a component that is configured to be coupled to a firewall. In other embodiments, module 10 is implemented as a component of a gateway 12 (or gateway product, such as an anti-virus module). In further embodiments, instead of being a component of gateway 12, module 10 can be a separate component that is coupled to gateway 12. In other embodiments, module 10 can be a gateway product by itself, and can be implemented at any point along a communication path between sender 12 and receiver 13. In further embodiments, module 10 could be used in a switch, such as a security switch.

Figure 2:
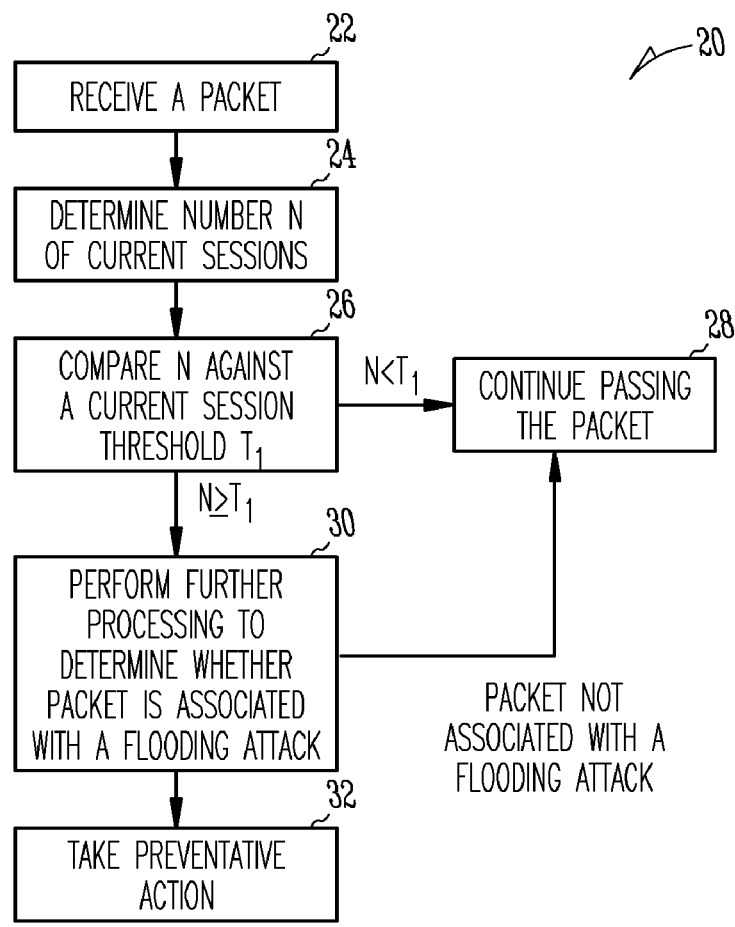
FIG. 2 illustrates a method for processing network traffic data in accordance with some embodiments.
Figure 2A:
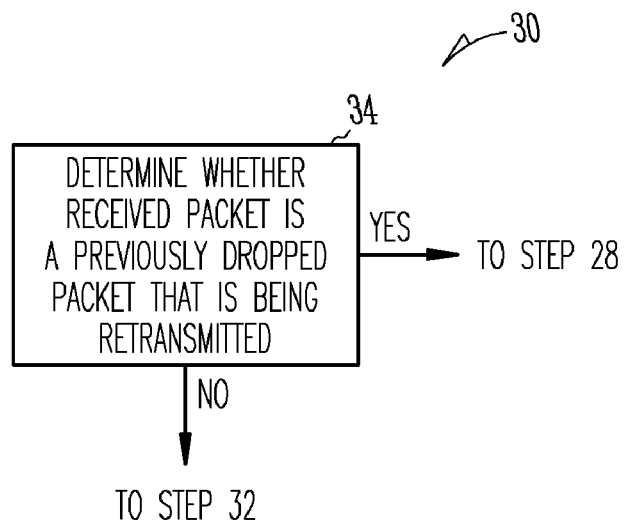
FIG. 2A illustrates a method of carrying out a step of the method of FIG. 2 in accordance with some embodiments.

FIG. 2 illustrates a method 20 for processing network traffic data using module 10 in accordance with some embodiments. First, module 10 receives network traffic data (packet) from sender 12 (Step 22). In the illustrated embodiments, the network traffic data is a packet used in a process for establishing a connection, transmitting data, or shutdown a connection. For example, the received data can be a TCP packet (such as a SYN packet) that includes a TCP header. However, the received data can be other types of packet in other embodiments.

Module 10 next updates a concurrent session counter N, which represents a number of sessions being processed at a gateway (e.g., at module 10) (Step 24). In some embodiments, the concurrent session counter N represents a number of sessions that are transmitted from one or more sender(s) (or host(s)). In such cases, different concurrent session counters $N_i$ can each be used to keep track with the number of sessions from a different sender or from a different group of senders. In other embodiments, the concurrent session counter N represents a number of sessions that are targeted against one or more receiver(s) (e.g., a website). In such cases, different concurrent session counters $N_i$ can each be used to keep track with the number of sessions targeted against a different receiver or against a different group of receivers. In other embodiments, the concurrent. For example, module 10 can update the concurrent session counter N by incrementing the value N by one. In the illustrated embodiments, a storage device can be used for storing the concurrent session counter. The storage device can be a disk, a computer hard drive, a server, a memory, or any device capable of storing electronic information. Such storage device can be a component of module 10, a component that is configured to integrate with module 10, or a component that is coupled to module 10 via a communication link (wire or wireless).

Next, module 10 compares the concurrent session counter N with a prescribed concurrent session threshold $T_1$ (Step 26). If the concurrent session counter N is less than the prescribed concurrent session threshold $T_1$, the network traffic data is determined not to be associated with a flooding attack. In such cases, module 10 then passes the network traffic data downstream (Step 28). In some embodiments, module 10 passes the network traffic data to receiver 13. In other embodiments, module 10 passes the network traffic data to another module or processing unit for further processing the network traffic data. For example, module 10 can pass the network traffic data to a policy enforcement module (not shown), which performs policy enforcement on the traffic data before passing it onto receiver 13. As another example, module 10 can pass the network traffic data to a content detection module (not shown), which determine whether the network traffic data is an undesirable content, such as a virus, a worm, a trojan hourse, etc. In other embodiments, data received from sender 12 is transmitted to policy enforcement module which performs policy enforcement on the received data before the received data is passed to module 10 for flooding detection.

If the concurrent session counter N is greater than or equal to the prescribed concurrent session threshold $T_1$, then module 10 performs additional process to determine if the received packet is associated with a flooding attack (Step 30). In the illustrated embodiments, if the received packet is connection-based (having protocol that includes a retransmission mechanism), module 10 uses a retransmission feature associated with the received packet to determine whether the received packet is associated with a flooding attack (FIG.

2A). In such cases, if the concurrent session counter N is greater than or equal to the prescribed concurrent session threshold $T_1$, module 10 then determines whether the received packet is a newly received packet (i.e., one that has not been received previously) (Step 34). For example, module 10 can determine whether the received packet is a newly received packet by using a log that records previously received packets. In such cases, module 10 compares the received packet with records in the log, and determines whether the received packet is a newly received packet (if no match is found in the log) or a retransmitted packet (if a match is found in the log). In some embodiments, a hash table (an example of a log) can be used by module 10 to keep track of previously received records. Such technique is beneficial in that it obviates the need to save all previously received packets, thereby saving memory.

If the received packet is a newly received packet, module 10 then drops the packet, regardless of whether the packet is in fact associated with a flooding attack or not (Step 32). Since an authentic packet (one that is not associated with a flooding attack) will always be retransmitted after it is dropped, if the packet dropped by module 10 is authentic, the dropped packet will be retransmitted to the module 10. If the dropped packet is one that is associated with a flooding attack, it may not be retransmitted to module 10, at least not within a prescribed period.

In some embodiments, in addition to determining whether there is a match between the currently received packet and a record in the log, module 10 also determines whether the packet is being transmitted within a prescribed period from a transmission time associated with a record in the log (e.g., by comparing the transmission time of the current packet with the transmission time associated with a record in the log). The transmission time comparison can be performed before or after the received packet is compared with the log records to determine if there is a match. If the current packet is received within a prescribed time (e.g., one minute, one hour, one day, etc.) from the transmission time of a matched record in the log, then the received packet is determined not to be associated with a flooding attack. This technique is based on the fact that an authentic packet will usually be retransmitted within a certain time period. In some embodiments, received packet and/or dropped packet is time-stamped, and a hash table can be used to organize information about these packets. It should be noted that the term "transmission time" (or "retransmission time") can be a time in which a packet is transmitted by a sender, or alternatively, a time in which a packet is received by module 10.

In other embodiments, instead of, or in addition to, using the above described techniques, module 10 can be configured to determine whether a received packet is a retransmitted packet based on a protocol definition standard, such as RFC 793 (for TCP). For example, if a protocol definition standard requires a retransmitted packet to have characteristic "X," module 10 can then determine whether a received packet has characteristic "X" to decide whether the received packet is a retransmitted packet.

If module 10 determines that the received packet is a retransmitted packet within a prescribed period from its last transmission (indicating that the received packet is an authentic packet), module 10 then passes the data downstream (Step 28). On the other hand, if module 10 determines that the received packet is not a retransmission, module 10 then drops the packet (Step 32). In some embodiments, module 10 also terminates the session associated with the packet. After module 10 terminates a session, module 10 updates the concurrent session counter N by decrementing the value N by one. As such, the concurrent session counter N keeps track with a number of sessions that are being processed at a given time.

In the illustrated embodiments, different concurrent session thresholds $T_{1,n}$ are assigned for processing different types of received data. In some embodiments, TCP packets for different websites can be considered to be of different types. For example, a first concurrent session threshold $T_{1,1}$ can be assigned for processing SYN packet (an example of a TCP packet) associated with a first receiver IP address (e.g., a Yahoo IP address), and a second concurrent session threshold $T_{1,2}$ can be assigned for processing SYN packet associated with a second receiver IP address (e.g., a Google IP address). During use, module 10 determines the type of received data (e.g., SYN packet for a particular IP address), and applies the prescribed concurrent session threshold $T_1$ for the prescribed type of data when performing step 44. In other embodiments, a concurrent session threshold $T_1$ can be assigned for processing multiple types of received data (e.g., SYN packet associated with a plurality of receiver IP addresses).

In other embodiments, packets created in different times during the day can be considered to be of different types. For example, a first concurrent session threshold $T_{1,1}$ can be assigned for processing SYN packet created during a first time period (e.g., between 8:00 am to 5:00 pm), and a second concurrent session threshold $T_{1,2}$ can be assigned for processing SYN packet created during a second time period (e.g., between 5:00 pm to 8:00 am). During use, module 10 determines the time at which the received packet is created (e.g., using a timestamp), and applies the prescribed concurrent session threshold $T_1$ for the prescribed type of packet when performing step 26. In other embodiments, a concurrent session threshold $T_1$ can be assigned for processing received packets regardless of when they are created.

In the illustrated embodiments, the concurrent session threshold $T_1$ is determined and input by an administrator. In other embodiments, module 10 can be configured to have a learning feature in which module 10 determines the concurrent session threshold $T_1$ for a prescribed type of packet based on previously received packet having the same type. For example, based on a history log, module 10 can determine that an IP address tends to have more sessions than others, and therefore, assigns a higher concurrent session threshold $T_1$ value for the IP address. As another example, based on a history log, module 10 can determine that an IP address tends to have more sessions during a particular time period in the day, and therefore, assigns a higher concurrent session value for the IP address at that time period. As such, different concurrent session thresholds $T_1$ can be assigned for different IP addresses and/or time periods. In some embodiments, a user interface can be provided that allows a user to input the concurrent session threshold $T_1$, or to prescribe criteria or parameters for allowing module 10 to determine the concurrent session threshold $T_1$ for each data type.

As illustrated in the above embodiments, using a concurrent session counter to keep track with a number of sessions is advantageous in that the concurrent session counter can be used to detect a flooding attack. This is possible because in a flooding attack, many sessions (e.g., hundreds or thousands of sessions) may be generated by the attacker. As such, if a number of concurrent sessions is above the prescribed threshold $T_1$, it is likely that a flooding attack is occurring.

It should be noted that although embodiments of method 20 have been described, the scope of the invention should not be so limited. In other embodiments, method 20 can have order of steps that is different from that described previously. For example, in some embodiments, module 10 can update the concurrent session counter after step 26. Also, in other embodiments, module 10 does not perform steps 24 and 26 of method 20. In further embodiments, any combination of the steps of method 20 can be carried out before or after policy enforcement is performed on the received data. In addition, in other embodiments, instead of using a retransmission feature to detect a flooding attack, module 10 can be configured to perform other technique(s) known in the art to determine whether the received packet is associated with a flooding attack.

Figure 3:
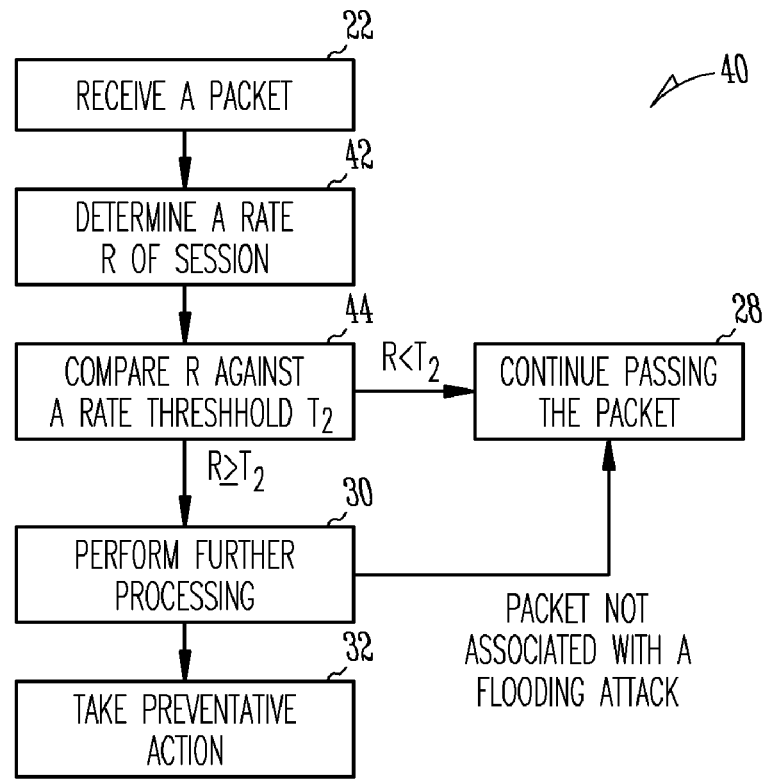
FIG. 3 illustrates a method for processing network traffic data in accordance with other embodiments.

Although method 20 has been described with reference to the concurrent session counter N, in other embodiments, other types of counter may be used. FIG. 3 illustrates a method 40 for processing network traffic data using module 10 in accordance with other embodiments, wherein a session rate R (a rate-based counter) is used instead of the concurrent session counter N. First, module 10 receives data from sender 12 (Step 22). In the illustrated embodiments, the network traffic data is a packet used in a process for establishing a connection, transmitting data, or shutdown a connection. For example, the received data can be a TCP packet that includes a TCP header. However, the received data can be other types of packet in other embodiments.

Module 10 next updates a session rate R, which represents a number of sessions that are received within a time period, such as one second (Step 42). For example, module 10 can be configured to update the session rate R by determining a number n of sessions being received within a time period t, and dividing the number n by t (i.e., R=n/t). In some cases, the session rate R represents a number of requests sent to receiver 13 within a prescribed period t. In the illustrated embodiments, a storage device can be used for storing the session rate R. The storage device can be a disk, a computer hard drive, a server, a memory, or any device capable of storing electronic information. Such storage device can be a component of module 10, a component that is configured to integrate with module 10, or a component that is coupled to module 10 via a communication link (wire or wireless).

Next, module 10 compares the session rate R with a prescribed session rate threshold $T_2$ (Step 44). If the session rate R is less than the prescribed session rate threshold $T_2$, the network traffic data is determined not to be associated with a flooding attack. In such cases, module 10 then passes the network traffic data downstream (Step 28), as similarly discussed with reference to method 20.

If the session rate R is greater than or equal to the prescribed session rate threshold $T_2$, then module 10 performs additional process to determine if the received data is associated with a flooding attack (Step 30), as similarly discussed with reference to method 20. If module 10 determines that the received data is not associated with a flooding attack, module 10 then passes the data downstream (Step 28). Otherwise, module 10 drops 32 the packet (Step 32).

In the illustrated embodiments, different session rate thresholds $T_{2,n}$ are assigned for processing different types of received packet. In some embodiments, TCP packets for different websites can be considered to be of different types. For example, a first session rate threshold $T_{2,1}$ can be assigned for processing SYN packet (an example of a TCP packet) associated with a first receiver IP address (e.g., a Yahoo IP address), and a second session rate threshold $T_{2,2}$ can be assigned for processing SYN packet associated with a second receiver IP address (e.g., a Google IP address). During use, module 10 determines the type of received packet (e.g., SYN packet for a particular IP address), and applies the prescribed session rate threshold $T_2$ for the prescribed type of packet when performing step 44. In other embodiments, a session rate threshold $T_2$ can be assigned for processing multiple types of received packet (e.g., SYN packet associated with a plurality of receiver IP addresses).

In other embodiments, packets created in different times during the day can be considered to be of different types. For example, a first session rate threshold $T_{2,1}$ can be assigned for processing SYN packet created during a first time period (e.g., between 8:00 am to 5:00 pm), and a second session rate threshold $T_{2,2}$ can be assigned for processing SYN packet created during a second time period (e.g., between 5:00 pm to 8:00 am). During use, module 10 determines the time at which the received packet is created (e.g., using a timestamp), and applies the prescribed session rate threshold $T_2$ for the prescribed type of packet when performing step 44. In other embodiments, a session rate threshold $T_2$ can be assigned for processing received packets regardless of when they are created.

In the illustrated embodiments, the session rate threshold $T_2$ is determined and input by an administrator. In other embodiments, module 10 can have and learning feature in which module 10 determines the session rate threshold $T_2$ for a prescribed type of packet based on previously received packet having the same type. For example, based on a history log, module 10 can determine that an IP address tends to have a higher session rate than others, and therefore, assigns a higher session rate threshold $T_2$ value for the IP address. As another example, based on a history log, module 10 can determine that an IP address tends to have a higher session rate during a particular time period in the day, and therefore, assigns a higher session rate threshold $T_2$ for the IP address at that time period. As such, different session rate thresholds $T_2$ can be assigned for different IP addresses and/or time periods. In some embodiments, a user interface can be provided that allows a user to input the session rate threshold $T_2$, or to prescribe criteria or parameters for allowing module 10 to determine the session rate threshold $T_2$ for each data type.

Using the session rate R to keep track with a number of sessions being processed per time period is advantageous in that the session rate R can be used to detect a flooding attack. This is possible because in a flooding attack, many sessions (e.g., hundreds or thousands of sessions) may be received within a time period. As such, if a number of sessions received within a prescribed time period is above the prescribed session rate threshold $T_2$, it is likely that a flooding attack is occurring.

It should be noted that although embodiments of method 40 have been described, the scope of the invention should not be so limited. In other embodiments, method 40 can have order of steps that is different from that described previously. For example, in some embodiments, module 10 can update the session rate R after step 44. Also, in other embodiments, module 10 does not perform steps 42 and 44, of method 40. In further embodiments, any combination of the steps of method 40 can be carried out before or after policy enforcement is performed on the received packet. In addition, in other embodiments, instead of using a retransmission feature to determine whether a received packet is associated with a flooding attack, module 10 can be configured to perform other technique(s) known in the art to determine whether the received data is associated with a flooding attack.

Figure 4:
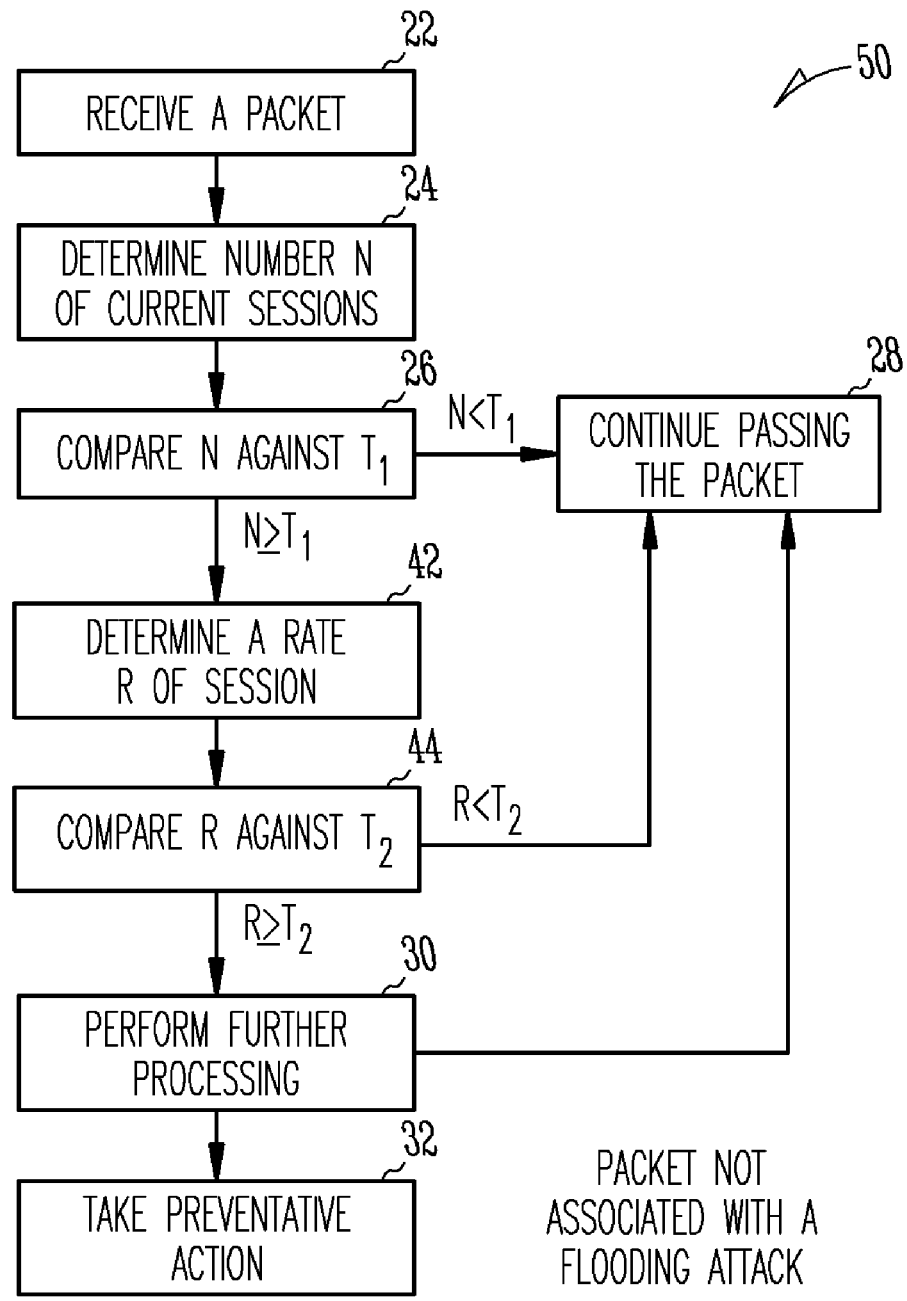
FIG. 4 illustrates a method for processing network traffic data in accordance with other embodiments.

In other embodiments, module 10 may be configured to use both the concurrent session counter N and the session rate R. FIG. 4 illustrates a method 50 for processing network traffic data using module 10 in accordance with other embodiments. First, module 10 receives data from sender 12 (Step 22). Next, module 10 updates the concurrent session counter N (Step 24), and compares the updated concurrent session counter N against the prescribed concurrent session threshold $T_1$ (Step 26). If the concurrent session counter N is less than the prescribed concurrent session threshold $T_1$, the network traffic data is determined not to be associated with a flooding attack. In such cases, module 10 then passes the network traffic data downstream (Step 28). Steps 24, 26 are similar to those discussed with reference to FIG. 2.

If the concurrent session counter N is larger than or greater than the prescribed concurrent session threshold $T_1$, module 10 then updates a session rate R (a rate-based counter), which represents a number of sessions that are received within a time period, such as one second (Step 42). Next, module 10 compares the session rate R with a prescribed session rate threshold $T_2$ (Step 44). Steps 42, 44 are similar to those discussed with reference to FIG. 3.

If the session rate R is less than the prescribed session rate threshold $T_2$, the network traffic data is determined not to be associated with a flooding attack. In such cases, module 10 then passes the network traffic data downstream (Step 28).

If the session rate R is greater than or equal to the prescribed session rate threshold $T_2$, then module 10 performs additional process to determine if the received data is associated with a flooding attack (Step 30). For example, in some embodiments, module 10 can be configured to use a retransmission feature to determine whether a received packet is associated with a flooding attack, as discussed with reference to method 20. If module 10 determines that the received data is not associated with a flooding attack, module 10 then passes the data downstream (Step 28). Otherwise, module 10 drops the packet and/or terminates the session associated with the packet (Step 32).

Using both the concurrent session counter N and the session rate R to detect flooding attack is advantageous in that the counter N can be used as a backup for the session rate R, and vice versa, thereby providing a more reliable flooding detection. For example, in some cases, it may be possible that a flooding attack cannot be detected using the concurrent session counter N (e.g., because the counter N is below the prescribed threshold $T_1$). In such cases, the session rate R can be used as a backup defense to detect a flooding attack. Also, in other cases, it may be possible that a flooding attack cannot be detected using the session rate R (e.g., because the rate R is below the prescribed threshold $T_2$). In such cases, the concurrent session counter N can be used as a backup defense to detect a flooding attack.

It should be noted that although embodiments of method 50 have been described, the scope of the invention should not be so limited. In other embodiments, method 50 can have orders of steps that is different from that described previously. For example, in some embodiments, module 10 can update the concurrent session counter N after step 26 and/or update the session rate R after step 44. In other embodiments, module 10 can perform step 24 before, or simultaneously with, step 42. Also, in other embodiments, module 10 does not perform steps 24, 26, and/or steps 42 and 44, of method 50. In further embodiments, any combination of the steps of method 50 can be carried out before or after policy enforcement is performed on the received data.

Figure 5:
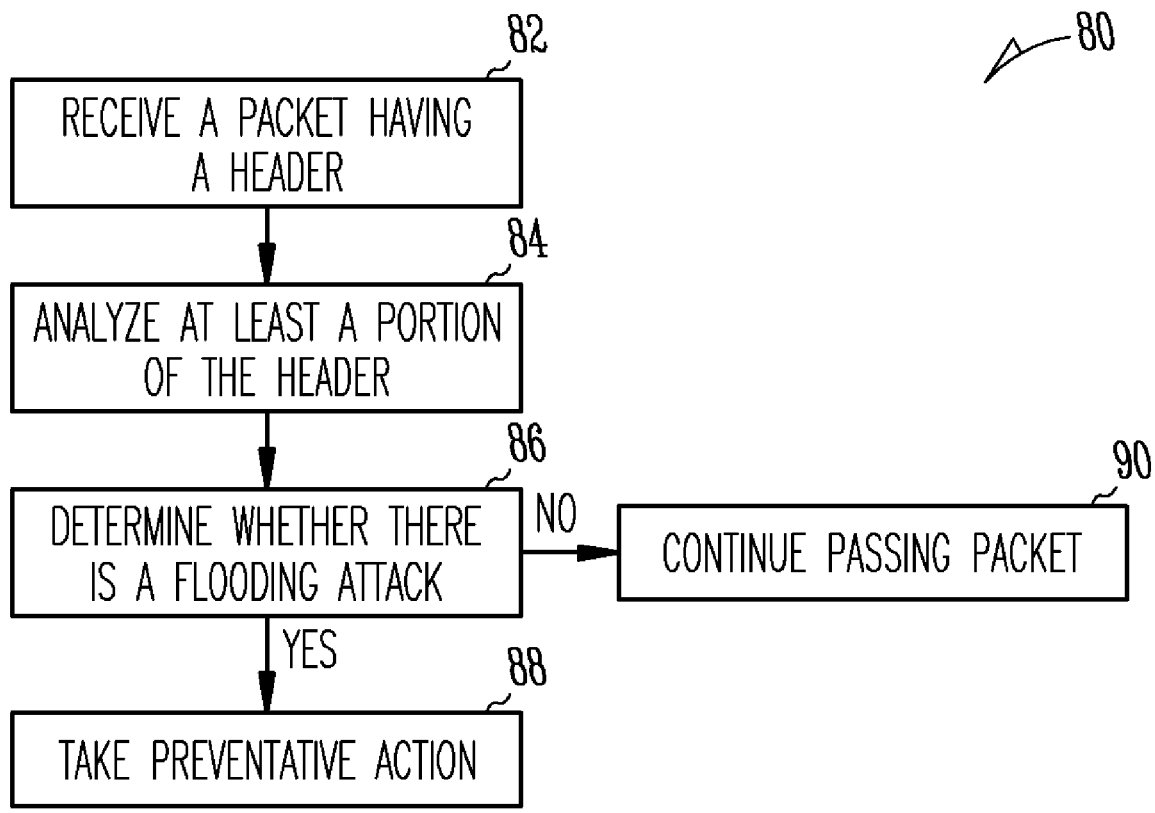
FIG. 5 illustrates a method for processing network traffic data in accordance with other embodiments.

FIG. 5 illustrates a method 80 for detecting a flooding attack using module 10 in accordance with other embodiments. Method 80 can be used in conjunction with any of the methods described herein. For example, in some embodiments, method 80 can be performed in step 30 of method 20, 40, or 50. In some embodiments, method 80 is used instead of the flooding detection technique that uses a retransmission feature of a packet (discussed herein). In other embodiments, method 80 is used in conjunction with the flooding detection technique that uses a retransmission feature of a packet, to thereby improve a flooding detection accuracy and/or efficiency. In other embodiments, method 80 can be used individually to detect flooding attack(s). Method 80 can also be combined with other techniques known in the art to detect flooding attack(s) in other embodiments.

First, module 10 receives data (packet) from sender 12 (Step 82). In the illustrated embodiments, the received packet includes a header, such as a TCP header, an IP header, an UDP header, or an ICMP header. In other embodiments, the received packet can include other types of header.

Figure 6A:
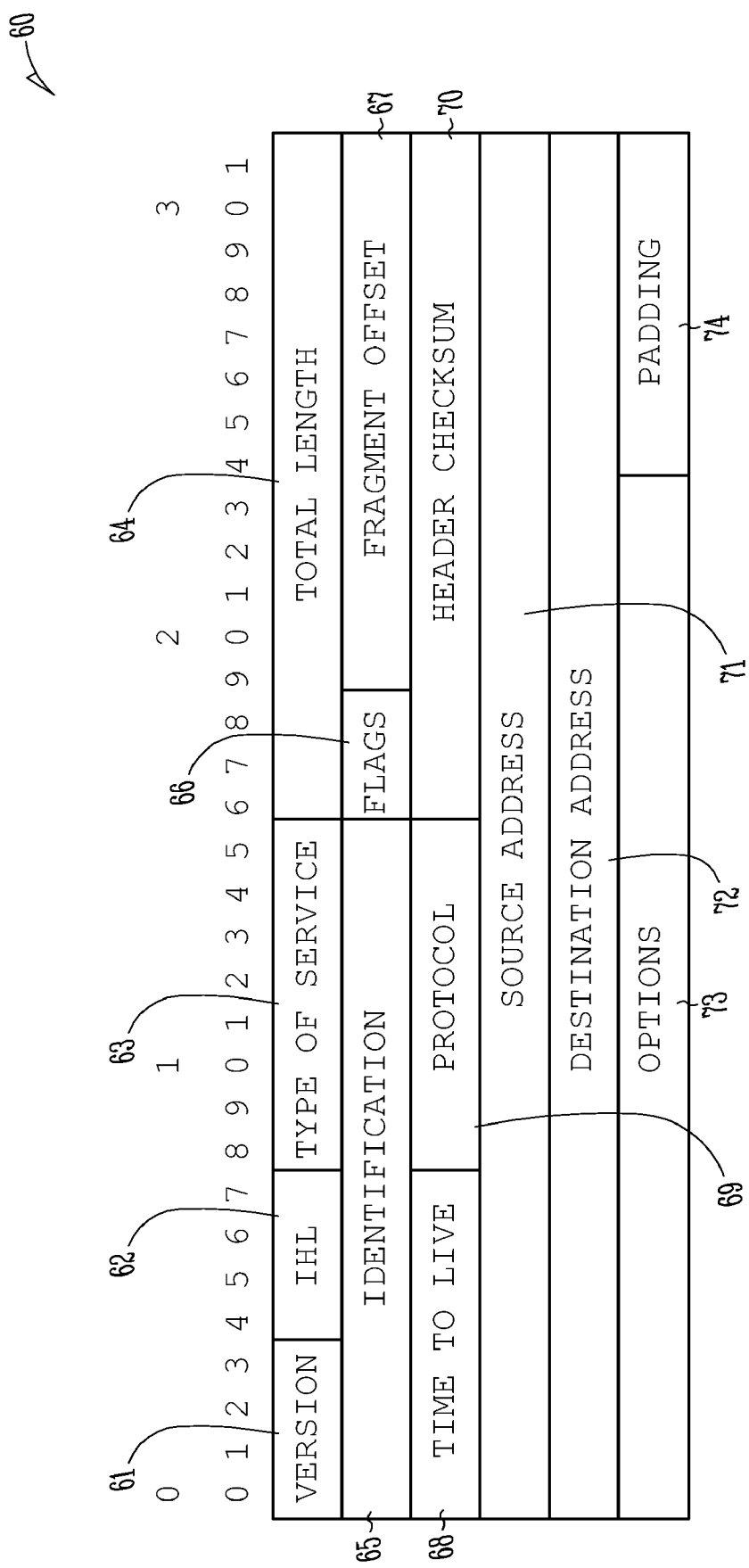
FIG. 6A illustrates an example of an IP header that can be analyzed using module of FIG. 1.
Figure 6B:
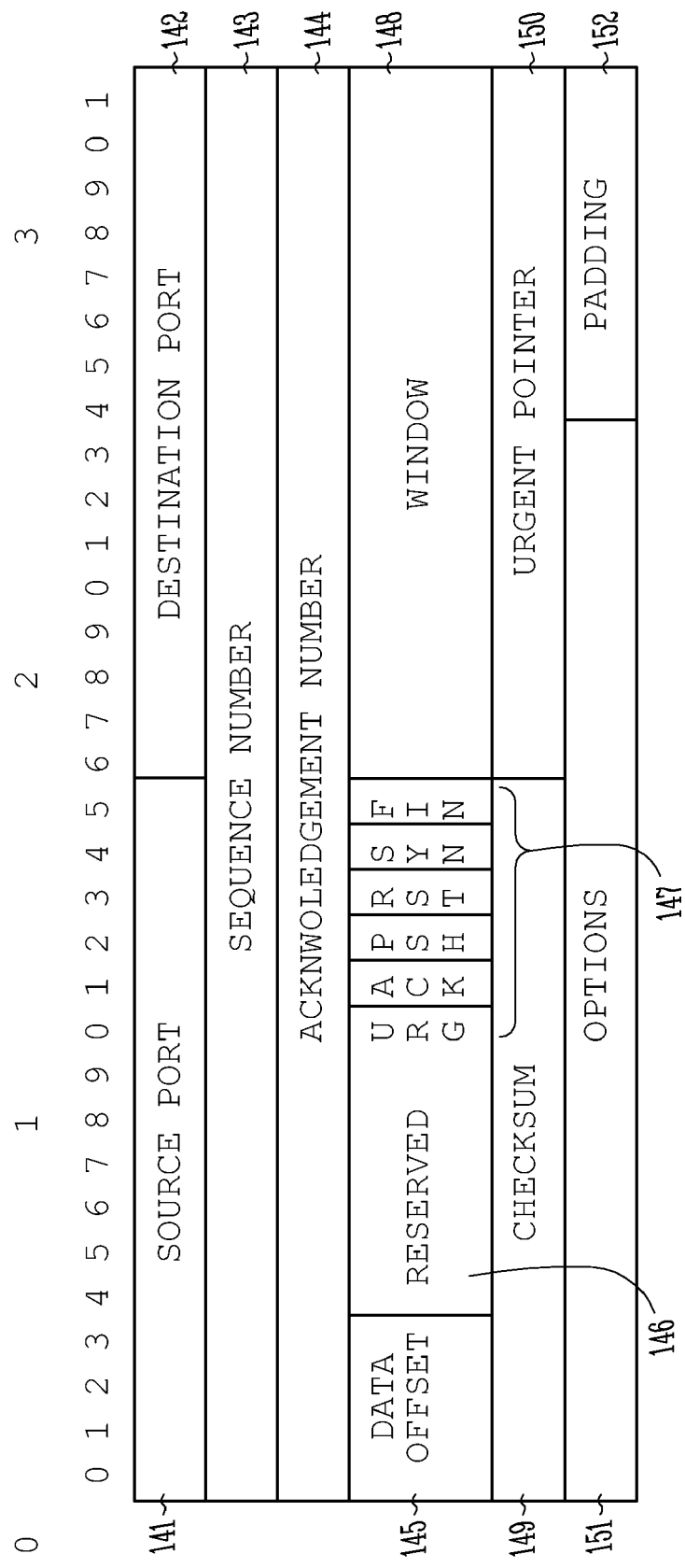
FIG. 6B illustrates an example of a TCP header that can be analyzed housing module of FIG. 1.

The received header includes one or more header fields. FIG. 6A illustrates an example of a header data structure 60, which includes an IP protocol version field 61, an IHL field 62, a service type field 63, a length field 64, an identification field 65, a flag field 66, a fragment offset field 67, a time to live field 68, a protocol field 69, a header checksum field 70, a source address field 71, a destination address field 72, an option field 73, and a padding field 74. Each of the header fields 61-74 has a field value associated therewith. FIG. 6B illustrates an example of a TCP header data structure 140, which includes a source port 141 field, a destination port field 142, a sequence number field 143, an acknowledgment number field 144, a data offset field 145, a reserved field 146, flag fields 147, a window field 148, a checksum field 149, an urgent pointer field 150, an option field 151, and, a padding field 152. It should be noted that the received header is not limited to the examples discussed previously, and that depending on the type of packet received, the header of the received packet will have different types of header fields.

Next, module 10 examines respective one or more header fields of a plurality of received headers to determine whether the respective header field values of the received headers form a prescribed pattern (Step 84). For example, in some embodiments, module 10 is configured to compare a value in one of the fields 61-74 (e.g., field 61) in a first header, with a value in a respective field (e.g., field 61) in a second header, to determine if the first and second header field values form a prescribed pattern. As used in this specification, the term "prescribed pattern" refers to a pattern formed by two or more values, an identification of which (the pattern) can be used to detect a flooding attack. Examples of a prescribed pattern include, a pattern formed by two or more values that are identical, two or more sequentially increasing values (e.g., by a constant increment), two or more sequentially decreasing values, and two or more values having same attributes (e.g., checksum value). In some embodiments, module 10 includes a user interface that allows an administrator to select or determine a prescribed pattern for use to detect flooding attacks. In the illustrated embodiments, module 10 is configured to determine that a flooding attack is occurring when a prescribed pattern formed by header fields in a plurality of headers is detected, and that a flooding attack is not occurring when a prescribed pattern is not detected (Step 86).

Several examples of using prescribed pattern to identify flooding attacks will now be described. In some embodiments, module 10 is configured to examine (e.g., determine) the sequence number with host or network order associated with packets. Sequence number is a portion in TCP header. It is also called ISN (Initial Sequence Number) in SYN packet. In the illustrated embodiments, module 10 is configured to keep track with the number of SYN packets having sequence number with host or network order that fit within a prescribed pattern. For example, if the number of SYN packets (1) having the same sequence number, (2) having sequence number with host or network order that are sequentially increasing, or (3) having sequence number with host or network order that are sequentially decreasing, exceeds a prescribed threshold $T_3$, such as ten, then module 10 determines that a flooding attack is occurring. This technique is based on the fact that a sequence number associated with a first authentic packet is generally unrelated to (and therefore appears random from) the sequence number associated with a second authentic packet. Many flooding tools try to generate SYN packets as fast as possible, and therefore, create packets having the same sequence number. Some tools increase the sequence number by one with host order or network order. As such, if a number of packets having sequence number appear to have a regular pattern, it is likely that there is a flooding attack. In other embodiments, the prescribed threshold $T_3$ may be more or less than ten.

Similar techniques may be used with respect to identification field value in IP header. The identification field value in IP header is used to uniquely identify the fragments of a particular datagram. It serves similar function as sequence number in TCP header. In some embodiments, if the number of packets having same or sequentially changed IP identification exceeds a prescribed threshold $T_4$, such as ten, then module 10 determines that a flooding attack is occurring. In other embodiments, the prescribed threshold $T_4$ may be more or less than ten.

In other embodiments, module 10 is configured to examine the TCP flag in SYN packets to determine whether a flooding attack is occurring. For example, module 10 can be configured to keep track with the number of packets having CWR, ECN, PSH, or their combination, turned on. If the number of packets having CWR, ECN, PSH, or their combination, turned on, exceeds a prescribed threshold $T_5$, such as ten, then module 10 determines that a flooding attack is occurring. This technique is based on the fact that many flooding tools set the same bit (e.g., a ECN bit, CWR bit, or PSH bit), or the same combination of bit (e.g., a ECN and CWR bit), in SYN packets. In other embodiments, the prescribed threshold $T_5$ may be more or less than ten.

In other embodiments, module 10 is configured to examine the TCP option or the IP option associated with packets to determine if the TCP or IP option has valid type or format. For example, if the number of packets having invalid type or format in the TCP or IP option exceeds a prescribed threshold $T_6$, such as ten, then module 10 determines that a flooding attack is occurring. This technique is based on the fact that an authentic packet generally has valid type or format associated with TCP or IP option. As such, if a number of packets having invalid type or format associated with their TCP or IP option, it is likely that there is a flooding attack. In other embodiments, the prescribed threshold $T_6$ may be more or less than ten. For example, in some embodiments, the prescribed threshold $T_6$ may be set to one. In such cases, if a received packet has invalid type or format in the TCP or IP option, module 10 then takes preventive action (step 32) without considering whether other packet(s) has a similar characteristic.

In other embodiments, module 10 is configured to examine a checksum in TCP or IP header. Checksum is generally included in TCP and IP header to ensure that bit stream is not damaged during transmission of packet. As such, checksum should be accurate in normal (non-attacking) traffic. In some embodiments, module 10 is configured to determine whether a checksum associated with a TCP or IP header is incorrect. If the checksum is determined to be incorrect, then module 10 determines that a flooding attack is occurring. This technique is based on the fact that many attackers do not take the effort to calculate the correct checksum for each flooding packet they send. In other embodiments, instead of TCP and IP headers, module 10 can be configured to examine a checksum in other types of headers. Also, in other embodiments, instead of using a checksum value to determine whether a header is associated with a flooding attack, module 10 can use a checksum value to detect other types of undesirable content, such as a virus, a worm, etc.

In other embodiments, module 10 is configured to examine a IP protocol version value in the IP protocol version field 61. For example, module 10 can be configured to determine whether a IP protocol version value is valid. If the IP protocol version value is determined to be invalid, module 10 then takes preventive action (Step 32). In other embodiments, module 10 is configured to keep track with the number of packets that have invalid IP protocol version values. If the number of such packets exceeds a prescribed threshold, module 10 then determines that a flooding attack is occurring.

In some cases, respective field values in two headers are not the same and do not form a sequentially increasing or decreasing pattern, but may still be considered related (or forming a prescribed pattern) if they contain similar attributes. For example, in some embodiments, if respective checksums of field values of two header fields are the same, or are within a prescribed range, the two headers may be considered related to each other (e.g., originating from a same flooding program). In other embodiments, other types of calculation or techniques can be used to determine whether two received packets are related.

It should be noted that the variables used to detect a prescribed pattern should not be limited to the examples discussed previously. In other embodiments, instead of, or in addition to, the above variables, module 10 can be configured to detect prescribed pattern(s) form by other variables (e.g., header field values) associated with received packets.

In other embodiments, one or more of the above techniques can be combined. For example, in some embodiments, module 10 is configured to examine both the sequence number and TCP flag of incoming packets, and determine whether the respective sequence numbers form a first prescribed pattern (e.g., have identical values, sequentially increasing values, or sequentially decreasing values), and whether the respective TCP flags form a second prescribed pattern (e.g., have identical values, sequentially increasing values, or sequentially decreasing values). In such cases, if the sequence numbers and the TCP flags form respective first and second prescribed patterns, module 10 then determines that a flooding attack is occurring.

Also, in any of the embodiments discussed herein, a prescribed time period can be used when detecting a prescribed pattern among received headers. For example, if two headers having sequential numbers that are identical are received within a prescribed period (e.g., 1 minute) from each other, then module 10 determines that a prescribed pattern has been detected. On the other hand, if two TCP headers having sequence numbers that are identical are received beyond a prescribed period (e.g., 1 hour, etc.) from each other, then module 10 determines that no prescribed pattern has been detected.

Regardless of the technique used, if module 10 determines that a flooding attack is occurring, module 10 then prevents packet having field value(s) that fall within the detected pattern from being sent to receiver 13 (Step 88). For examples, module 10 can be configured to drop a packet, terminate a session (e.g., TCP re-sets or ICMP unreachable messages), or send a notification to a designated receiver indicating that a flooding attack has been detected. In other embodiments, module 10 can be configured to gather information regarding the network traffic data that has been associated with a flooding attack. For example, module 10 can be configured to record all packets and associated information generated directly or indirectly by sender 12, including but not limited to, order, sequence, timestamps, transmission statistics, and type of packets, into a system log. Such information can be used to identify tool, methodology being used, and intention (e.g., vandalism, data theft, remote launch point search, etc.) of sender 12. The recorded information can also be used to identify future flooding attacks.

If module 10 determines that no flooding attack is occurring, module 10 then passes the network traffic data downstream (Step 90). In some embodiments, module 10 passes the network traffic data to receiver 13. In other embodiments, module 10 passes the network traffic data to another module or processing unit for further processing the network traffic data. For example, module 10 can pass the network traffic data to a policy enforcement module (not shown), which performs policy enforcement on the traffic data before passing it onto receiver 13. As used in this specification, the term "policy enforcement" refers to a process or procedure, an execution of which creates a result that can be used to determine whether to pass data to user, and includes (but is not limited to) one or a combination of: source verification, destination verification, user authentication, virus scanning, content scanning (e.g., scanning for undesirable content), and intrusion detection (e.g., detecting undesirable content, such as worms, porno website, etc.). As another example, module 10 can pass the network traffic data to a content detection module (not shown), which determine whether the network traffic data is/has an undesirable content, such as a virus, a worm, a trojan hourse, etc. Policy enforcement module and content detection module are known in the art. In other embodiments, data received from sender 12 is transmitted to policy enforcement module which performs policy enforcement on the received data before the received data is passed to module 10 for flooding detection.

Detecting flooding attack based on identifying a prescribed pattern form by header fields of packets is advantageous in that it requires relatively low system resources compared to conventional techniques, such as SYN proxy to track each packet. The above described technique also allows flooding attack to be detected more accurately since a packet may appear legitimate by itself, but may form a pattern with one or more other packets that are associated with a flooding attack.

It should be noted that module 10 and processes 20, 40, 50, 80 are not limited to detecting TCP flooding attacks. In other embodiments, module 10 and processes 20, 40, 50, 80 may be used to detect other connection based flooding attacks, in which received data is a packet used in a process for establishing a connection, transmitting data, or shutdown a connection. In further embodiments, module 10 and any of the methods described herein can be used to detect non-connection based flooding attacks, such as UDP and ICMP flooding attacks. In such cases, module 10 is configured to generate a virtual session such that the UDP packets and/or the ICMP packets can be processed in the same or similar ways as that of a TCP packet. The virtual session can be any data structure that correlates packets between sender 12 and receiver 13, to thereby track UDP and ICMP traffic. In some embodiments, module 10 includes a protocol differentiator (not shown), which examines headers of the network traffic and determines the types of data being processed. Module 10 then analyzes traffic data using prescribed technique, depending on the type of network traffic received.

Computer Architecture

Figure 7:
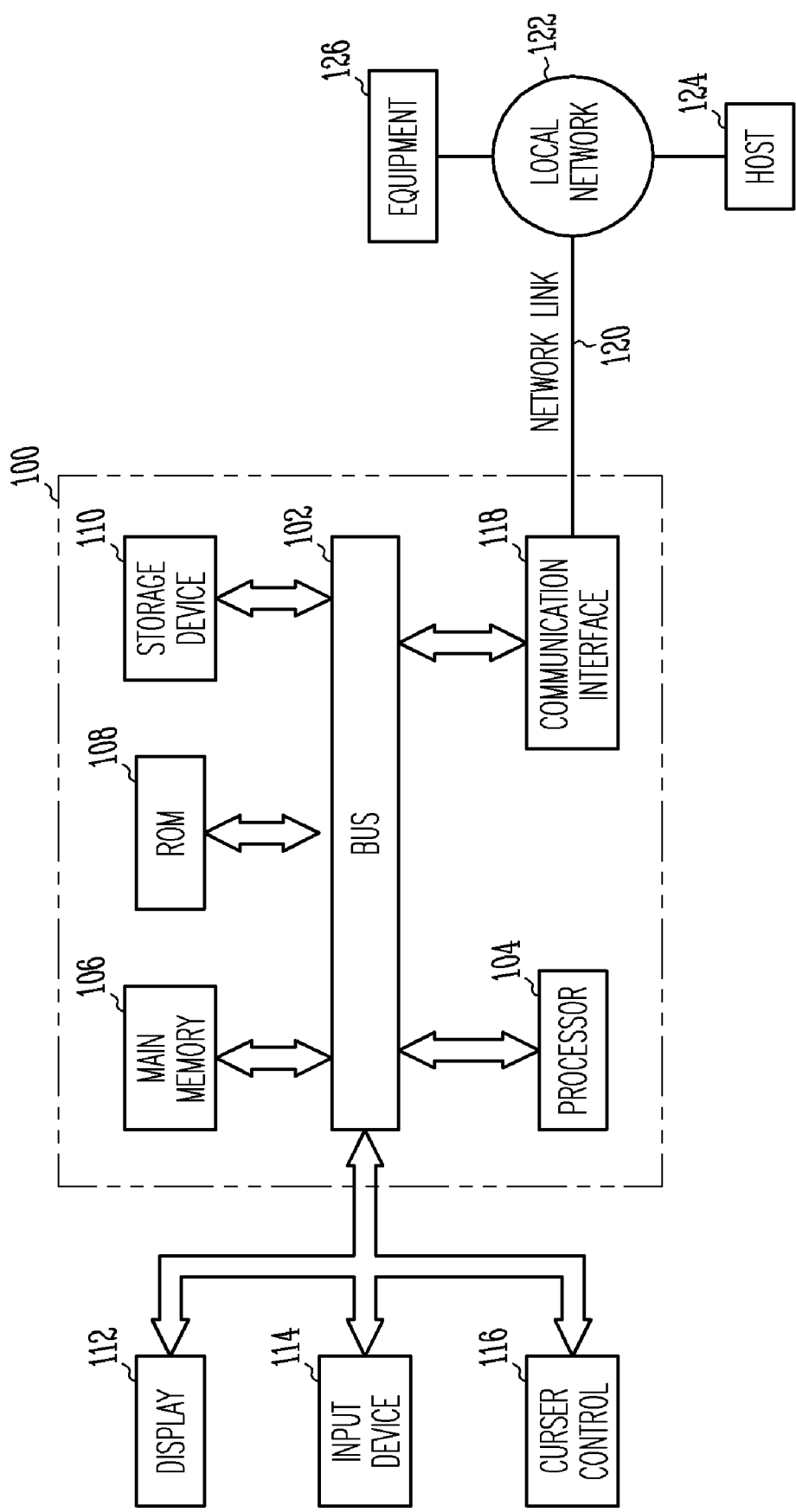
FIG. 7 is a diagram of a computer hardware system with which embodiments described herein can be implemented.

As described previously, module 10 can be implemented using software, hardware, or combination therefore. However, those skilled in the art understand that a computer system may also be used to implement module 10 to perform the same or similar functions described herein. FIG. 7 is a block diagram that illustrates an embodiment of a computer system 100 upon which embodiments of the methods 20, 40, 50 and/or 80 may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 may further include a read only memory (ROM) 108 or other static storage device coupled to bus 102 for storing static information and instructions for processor 104. A data storage device 110, such as a magnetic disk or optical disk, is provided and coupled to bus 102 for storing information and instructions.

Computer system 100 may be coupled via bus 102 to a display 112, such as a cathode ray tube (CRT), for displaying information to user 104. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 can be used for processing network traffic data, such as a packet, a header, or a portion of a header. According to some embodiments, such use may be provided by computer system 100 in response to processor 104 executing one or more sequences of one or more instructions contained in the main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement embodiments described herein. Thus, embodiments described herein are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that, comprise bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry data streams representing various types of information.

Network link 120 typically provides data communication through one or more networks to other devices. For example, network link 120 may provide a connection through local network 122 to a host computer 124. Network link 120 may also transmits data between an equipment 126 and communication interface 118. The data streams transported over the network link 120 can comprise electrical, electromagnetic or optical signals. The signals through the various networks and the signals on network link 120 and through communication interface 118, which carry data to and from computer system 100, are exemplary forms of carrier waves transporting the information. Computer system 100 can send messages and receive data, including program code, through the network(s), network link 120, and communication interface 118. Although one network link 120 is shown, in alternative embodiments, communication interface 118 can provide coupling to a plurality of network links, each of which connected to one or more local networks. In some embodiments, computer system 100 may receive data from one network, and transmit the data to another network. Computer system 100 may process and/or modify the data before transmitting it to another network.

Although particular embodiments have been shown and described, it will be understood that it is not intended to limit the present inventions to the preferred embodiments, and it will be obvious to those skilled in the art that various changes and modifications may be made without departing from the spirit and scope of the present inventions. For example, in other embodiments, one or more functions performed by module 10 may be implemented using one or more processors, or one or more software. Also, in alternative embodiments, module 10 needs not perform all of the steps in FIGS. 2-5. For example, in other embodiments, module 10 does not perform Step 30, but receives a result of an analysis from a source. In such cases, based on the received result, module 10 then determines whether to take preventive action (Step 28) or to continue passing data to receiver 13 (Step 32). The specification and drawings are, accordingly, to be regarded in an illustrative rather than restrictive sense. The present inventions are intended to cover alternatives, modifications, and equivalents, which may be included within the spirit and scope of the present inventions as defined by the claims.

The invention claimed is:

1. A method for processing network traffic content, comprising:
   receiving a plurality of headers, the plurality of headers having respective first field values; and
   determining whether the first field values of the respective headers form a first prescribed pattern, the determining being at least a part of classifying network traffic content as part of a flooding attack;
   wherein the determining comprises determining whether the first field values of the respective headers are identical by comparing a hash value calculated based at least in part on the first field value with a log of hash values calculated from at least first field values of previously received packets, the log stored on a data storage device, the log of hash values allowing for the comparing without requiring saving of previously received packets.

2. The method of claim 1, wherein the determining comprises:
   calculating checksum values for the respective first field values; and
   determining whether the checksum values form the first prescribed pattern.

3. The method of claim 1, wherein the plurality of headers are received within a prescribed period.

4. The method of claim 1, wherein each of the headers is selected from the group consisting of a TCP header, an IP header, an UDP header, and an ICMP header.

5. The method of claim 1, wherein each of the first field values is selected from the group consisting of a sequence number, a network order, an identification field value, a TCP flag, a TCP option, and an IP option.

6. The method of claim 1, further comprising determining whether second field values of the respective headers form a second prescribed pattern.

7. The method of claim 1, further comprising performing a task based at least in part on the determining, the task selected from the group consisting of dropping a packet, terminating a session, and sending a message to a user.

8. The method of claim 1, further comprising:
   receiving an additional header; and
   determining whether a portion of the additional header falls within the first prescribed pattern.

9. The method of claim 1, further comprising:
   receiving an additional header after the plurality of headers are received; and
   determining whether a portion of the additional header is related to a portion of a header associated with a flooding attack.

10. A computer product includes a non-transitory non-volatile or volatile computer-readable medium, the computer-readable medium having a set of stored instructions, executable by a processor to cause performance of the following:
    receiving a plurality of headers, the plurality of headers having respective first field values; and determining whether the first field values of the respective headers form a first prescribed pattern, the determining being at least a part of classifying network traffic content as part of a flooding attack;

wherein the determining comprises determining whether the first field values of the respective headers are identical by comparing a hash value calculated based at least in part on the first field value with a log of hash values calculated from at least first field values of previously received packets, the log stored on a data storage device, the log of hash values allowing for the comparing without requiring saving of previously received packets.

11. The computer product of claim 10, wherein the determining comprises:
- calculating checksum values for the respective first field values; and
- determining whether the checksum values form the first prescribed pattern.

12. The computer product of claim 10, wherein the plurality of headers are received within a prescribed period.

13. The computer product of claim 10, wherein each of the headers is selected from the group consisting of a TCP header, an IP header, an UDP header, and an ICMP header.

14. The computer product of claim 10, wherein each of the first field values is selected from the group consisting of a sequence number, a network order, an identification field value, a TCP flag, a TCP option, and an IP option.

15. The computer product of claim 10, wherein the computer-readable medium has further stored instructions, execution of which by the processor further causes performance of a determining whether second field values of the respective headers form a second prescribed pattern.

16. The computer product of claim 10, wherein the computer-readable medium has further stored instructions, execution of which by the processor further causes performance of a performance of a task based at least in part on the determining, the task selected from the group consisting of dropping a packet, terminating a session, and sending a message to a user.

17. The computer product of claim 10, wherein the computer-readable medium has further stored instructions, execution of which by the processor further causes performance of:
- receiving an additional header; and
- determining whether a portion of the additional header falls within the first prescribed pattern.

18. The computer product of claim 10, wherein the computer-readable medium has further stored instructions, execution of which by the processor further causes performance of:
- receiving an additional header after the plurality of headers are received; and
- determining whether a portion of the additional header is related to a portion of a header associated with a flooding attack.

* * * * *